United States Patent [19]

Freedy et al.

[11] 3,847,451
[45] Nov. 12, 1974

[54] FLAT TRACK SHOE WITH TAPERED END RIBS

[75] Inventors: Allan Leslie Freedy; Calvin Lyle Miller, both of Aurora; Fred Eugene Simpson, Oswego, all of Ill.

[73] Assignee: Caterpillar Tractor Co., Peoria, Ill.

[22] Filed: Dec. 4, 1972

[21] Appl. No.: 311,877

[52] U.S. Cl. ............................................. 305/54
[51] Int. Cl. ......................................... B62d 55/26
[58] Field of Search ................................. 305/54, 55

[56] References Cited
UNITED STATES PATENTS

| 3,336,088 | 8/1967 | Bawer | 305/54 |
| 3,578,824 | 5/1971 | Woodward | 305/54 |
| D157,905 | 3/1950 | Risk | 305/54 X |

Primary Examiner—Richard J. Johnson
Attorney, Agent, or Firm—Phillips, Moore, Weissenberger, Lempio & Strabala

[57] ABSTRACT

A track shoe has a base portion defining a substantially flat lower surface and a pair of ribs extending from either side thereof, each pair of ribs defining a pocket therebetween. The lower surfaces of the ribs are upwardly angled with respect to the lower surface of the base portion, and the edges connecting the lower surfaces of the ribs with the lower surface of the base portion, and also the forward and rearward edges of said lower surface of the base portion of the track shoe are smoothly contoured and curved to reduce damage to hard surfaces. Meanwhile, the ribs provide traction for soft ground conditions.

9 Claims, 2 Drawing Figures

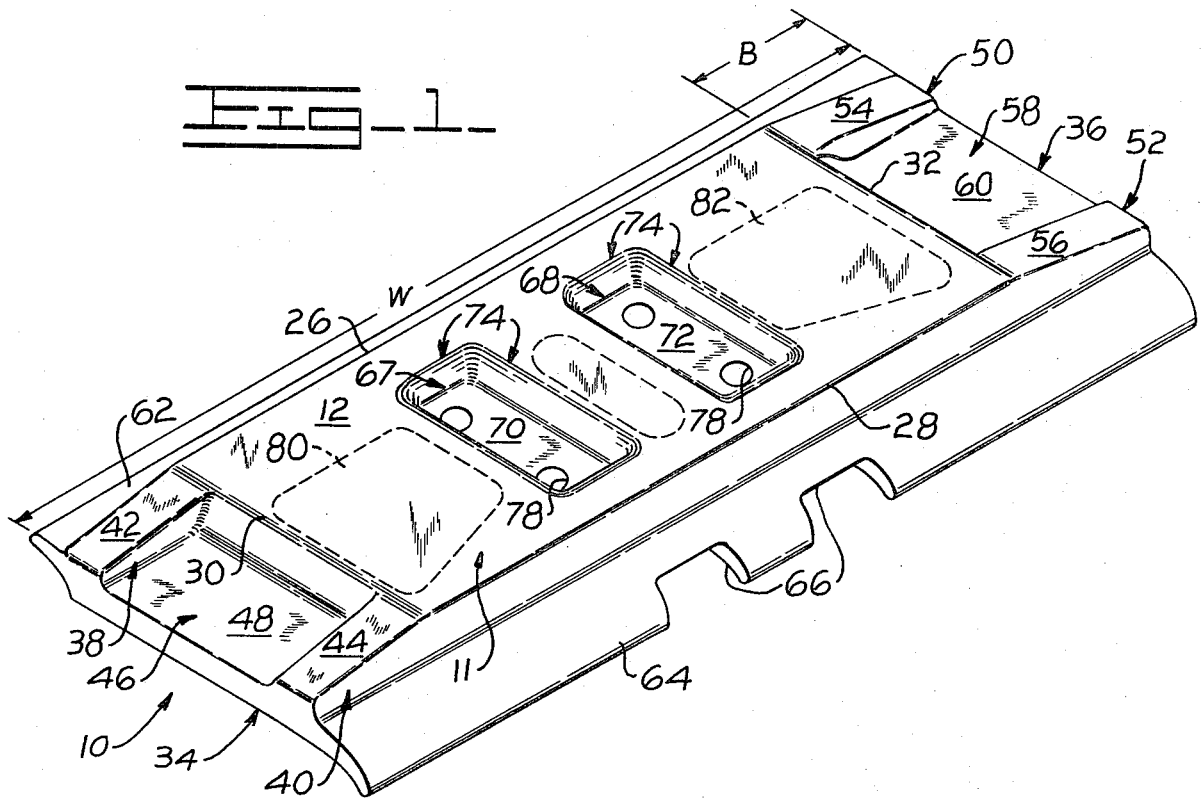
Fig. 1
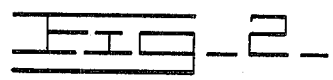
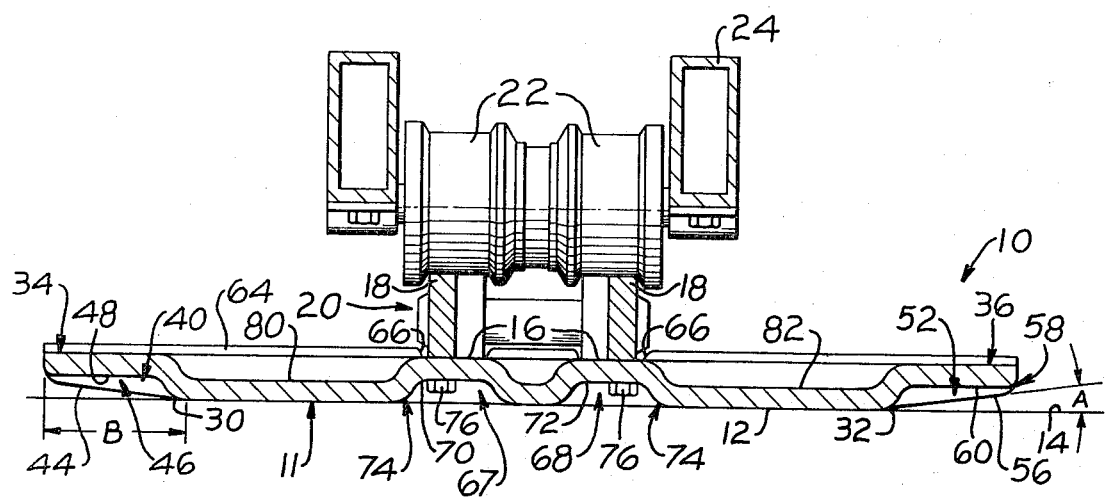

3,847,451

FLAT TRACK SHOE WITH TAPERED END RIBS

BACKGROUND OF THE INVENTION

Maneuvering heavy track-type vehicles over finished surfaces such as blacktop has traditionally caused severe abrasion and wear of these surfaces. The improved traction on soft ground conditions resulting from the use of one or more transversely arranged track shoe grousers has had to be sacrificed in order to avoid tearing up such finished surfaces. While relatively flat track shoes have been used for some time as a compromise, the pockets and ribs thereof provided for improved traction purposes have heretofore had sharp edges and end surfaces, resulting in excessive abrasion of the blacktop during maneuvering of the vehicle.

SUMMARY OF THE INVENTION

It is an object of this invention to provide a track shoe for use in a track-type vehicle which results in minimal damage to hard surfaces, meanwhile providing proper traction over soft ground conditions.

It is a further object of this invention to provide a track shoe for use in a track-type vehicle which, while fulfilling the above object, is simple in design and manufacture.

Broadly stated, the invention comprises a track shoe for a track-type tractor. Such track shoe comprises a base portion defining a generally flat lower surface defining a forward, a rearward, and a pair of sideward edges. A pair of end portions extend from the base portion, the lower surfaces of these end portions being angled upwardly from the lower surface of the base portion. The sideward edges interconnect the lower surface of the base portion and the lower surfaces of the end portions. The sideward edges are gradually curved and contoured to smoothly connect the lower surface of the base portion with the lower surfaces of the end portions.

BRIEF DESCRIPTION OF THE DRAWINGS

These and other objects of the invention will become apparent from a study of the following specification and drawings, in which:

FIG. 1 is a perspective view of the preferred embodiment of the inventive track shoe; and FIG. 2 is a sectional view showing the track shoe of FIG. 1 as mounted in place for use.

DESCRIPTION OF THE PREFERRED EMBODIMENT

Shown in FIGS. 1 and 2 is one of a plurality of like track shoes 10. Track shoe 10 is substantially flat and includes a base portion 11 defining a generally flat lower surface 12 in intimate contact with the surface 14 of a blacktop road or the like. Each shoe 10 has an inner planar surface 16 in intimate contact with a pair of transversely spaced links 18 forming part of a conventional endless track chain shown generally by the reference numeral 20. A vehicle (not shown) is supported on track chain 20 through a plurality of track rollers 22 secured to an undercarriage frame 24.

The lower surface 12 of the track shoe 10 defines a forward edge 26, a rearward edge 28, and sideward edges 30,32. The forward and rearward edges 26,28 are substantially parallel, and the sideward edges 30,32 are also substantially parallel.

End portions 34,36 extend from the base portion 11. End portion 34 defines first and second ribs 38,40 having lower surfaces 42,44 respectively, and a shoulder portion 46 the lower surface 48 of which interconnects the ribs 38,40 and is above the lower surface 12. Similarly, end portion 36 defines first and second ribs 50,52 having lower surfaces 54,56 respectively, and a shoulder portion 58 the lower surface 60 of which interconnects the ribs 50,52 and which is above the lower surface 12. The ribs 38,40 extend substantially parallel to the forward and rearward edges 26,28 respectively. Similarly, the ribs 50,52 extend substantially parallel to the forward and rearward edges 26,28 respectively.

The base portion 11 has extending therefrom oppositely disposed arcuate front and rear portions 62,64. A pair of link clearance grooves 66 are provided in the rear portion 64, and the arcuate portions 62,64 are provided for controlled close clearance purposes as the track chain 20 circumvents the conventional driving sprocket and idler wheel (not shown).

The forward and rearward edges 26,28 are gradually curved and contoured along their entire lengths, as shown, upwardly of the lower surface 12 of the base portion 11. The lower surfaces 42,44 54,56 of the ribs 38,40 50,52 are angled upwardly from the lower surface 12 of the base portion 11, as best shown in FIG. 2. The sideward edge 30 interconnects the lower surface 12 of the base portion 11 and the lower surfaces 42,44 of the ribs 38,40. Likewise, the sideward edge 32 interconnects the lower surface 12 of the base portion 11 with the lower surfaces 54,56 of the ribs 50,52. The sideward edge 30 is gradually curved and contoured along its entire length, to smoothly connect the lower surface 12 of the base portion 11 with the lower surfaces 42,44 of the ribs 38,40, and also in the area adjacent the shoulder portion 46. Similarly, the sideward edge 32 is gradually curved and contoured along its entire length, to smoothly connect the lower surface 12 of the base portion 11 with the lower surfaces 54,56 of the ribs 50,52, and also in the area adjacent the shoulder portion 58.

The base portion 11 of the track shoe 10 defines a pair of laterally spaced pockets 67,68, the lower surfaces 70,72 of which are above the lower surface 12 of the base portion 11. The lower surfaces 70,72 of the pockets 67,68 and the lower surface 12 of the portion 11 are interconnected by gradually curved and contoured portions 74 to smoothly connect them. These pockets 67,68 not only protect the head portions of a plurality of retaining bolts 76 which pass through a like plurality of bores 78 to secure the shoe 10 to the links 18 to protect the surface 14 from abrasion thereby, but also serve to increase the gripping relation of the shoe 10 to soft ground or the like.

A pair of pockets 80,82 are preferably contoured laterally along the sides thereof to proportionally increase the beam strength of the shoe 10 toward the shoe 10 center.

In actual use, it has been found advantageous to provide an angle "A" (FIG. 2) ( which is actually the angle between the lower surface of each rib and the lower surface 12 of the base portion 11) within the limits of from 2° to 15°, and a ratio of each rib sideward length "B" (or each end portion length) to the overall sideward length "W" (including end portions 34,36) of within the limits of 1:4 to 1:10. This has been found to give the best compromise between a relatively low effective pressure on the lower surface 12 of the base portion 11 and a relatively high gripping relation to a soft ground condition where traction is extremely important. The use of contoured edges in the appropriate places called for, of course, results in minimal damage to the finished surface 14.

What is claimed is:

1. A track shoe for a track-type tractor comprising:

a base portion defining a generally flat lower surface defining a forward, a rearward, and a pair of sideward edges;

a pair of end portions extending from the base portion, the lower surfaces of which are angled upwardly from the lower surface of the base portion;

the sideward edges interconnecting the lower surface of the base portion and the lower surfaces of the end portions;

the sideward edges being gradually curved and contoured to smoothly connect the lower surface of the base portion with the lower surfaces of the end portions;

each end portion defining a rib, the upwardly angled surface of that end portion comprising the lower surface of said rib;

the forward and rearward edges of the lower surface of the base portion being substantially parallel;

the rib defined by each end portion extending substantially parallel to the forward and rearward edges of the lower surface of the base portion, the rib defined by each end portion further defining an edge portion extending generally continously from one of said forward and rearward edges.

2. The track shoe of claim 1 wherein the lower surface of each end rib defines an angle with the lower surface of the base portion within the limits of from 2° to 15°.

3. The track shoe of claim 2 wherein the ratio of each end rib sideward length to the overall sideward length of the track shoe including such end ribs is within the limits of from 1:4 to 1:10.

4. The track shoe of claim 1 wherein each end portion further defines a second rib, the upwardly angled surface of that end portion also comprising the lower surface of said second rib, and an end portion surface portion interconnecting the first-mentioned and second ribs thereof, and having its lower surface above the lower surface of the base portion, and wherein the second rib of each end portion extends substantially parallel to the forward and rearward edges of the lower surface of the base portion.

5. The track shoe of claim 4 wherein the sideward edges of the lower surface of the base portion are substantially parallel.

6. The track shoe of claim 5 and further comprising a pocket defined by the base portion and having a lower surface above the lower surface of the base portion, the lower surface of the pocket and the lower surface of the base portion being interconnected by gradually curved and contoured portions to smoothly connect them.

7. The track shoe of claim 4 wherein the lower surface of each rib defines an angle with the lower surface of the base portion within the limits of from 2° to 15°.

8. The track shoe of claim 7 wherein the ratio of each end rib sideward length to the overall sideward length of the track shoe including such ribs is within the limits of from 1:4 to 1:10.

9. A track shoe for a track-type tractor comprising a base portion defining a generally flat lower surface defining a forward, a rearward, and a pair of sideward edges, a pair of end portions extending from the base portion, the lower surfaces of which are angled upwardly from the lower surface of the base portion, the sideward edges interconnecting the lower surface of the base portion and the lower surfaces of the end portions, the sideward edges being gradually curved and contoured to smoothly connect the lower surface of the base portion with the lower surfaces of the end portions, and wherein the ratio of each end portion sideward length to the overall sideward length of the track shoe including such end portions is within the limits of from 1:4 to 1:10 each end portion defining a rib, the upwardly angled surface of that end portion comprising the lower surface of said rib;

the forward and rearward edges of the lower surface of the base portion being substantially parallel;

the rib defined by each end portion extending substantially parallel to the forward and rearward edges of the lower surface of the base portion;

the rib defined by each end portion further defining an edge portion extending generally continuously from one of said forward and rearward edges.

* * * * *